J. E. L. CHATILLON.
FAUCET.
APPLICATION FILED SEPT. 26, 1910.

1,015,297.

Patented Jan. 23, 1912.
2 SHEETS—SHEET 1.

Witnesses
T. R. Balmer.
C. Ecksten.

Inventor.
J. E. L. Chatillon
by Lloyd Blackmon Atty

J. E. L. CHATILLON.
FAUCET.
APPLICATION FILED SEPT. 26, 1910.

1,015,297.

Patented Jan. 23, 1912.

2 SHEETS—SHEET 2.

Witnesses.
J. R. Balmer.
C. Eckstein.

Inventor.
J. E. L. Chatillon
by Lloyd Blackmore Atty

UNITED STATES PATENT OFFICE.

JOSEPH EDMOND LAURÉAT CHATILLON, OF HULL, QUEBEC, CANADA.

FAUCET.

1,015,297.  Specification of Letters Patent.  Patented Jan. 23, 1912.

Application filed September 26, 1910. Serial No. 583,919.

*To all whom it may concern:*

Be it known that I, JOSEPH EDMOND LAURÉAT CHATILLON, a subject of the King of Great Britain, residing at No. 15 Laurier avenue, in the city of Hull, in the Province of Quebec, in the Dominion of Canada, have invented certain new and useful Improvements in Faucets, of which the following is a specification.
The invention relates to improvements in faucets, as described in the present specification and illustrated in the accompanying drawings that form part of the same.

The invention consists essentially of the novel arrangement and construction of parts, whereby a faucet having separate cold and hot water inlets and two outlets has the flow of water through either of the outlets regulated by a single valve plug, having a pair of channels in peripheral alinement with one water inlet and adapted to be brought into communication with both outlets, and a third port parallel to the said pair of ports and in peripheral alinement with the other inlet and adapted to be brought into communication with both outlets.

The objects of the invention are to devise a faucet of cheap and simple construction, which will require only one valve plug and handle to regulate the supply of hot or cold water to a pair of taps, such as the basin tap and a shower or shampoo tap.

Figure 1:
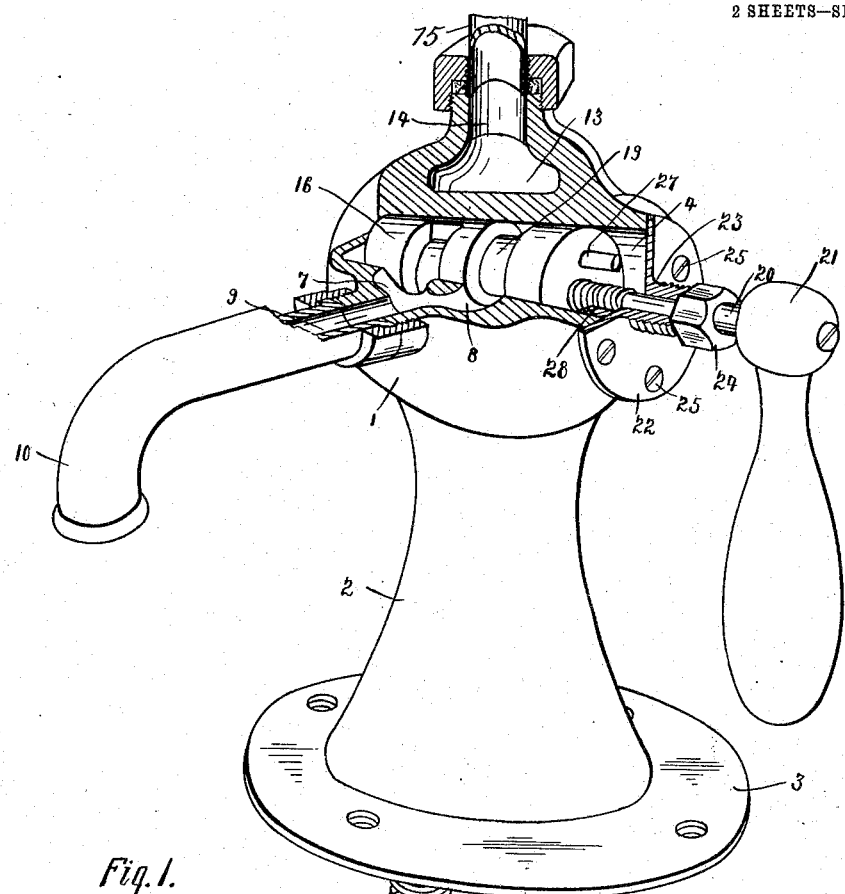
Figure 4:
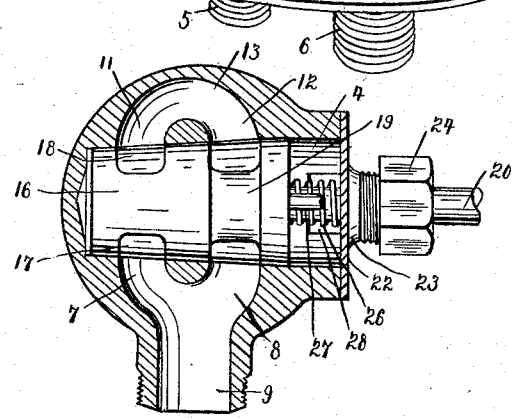
Figures 2, 3:
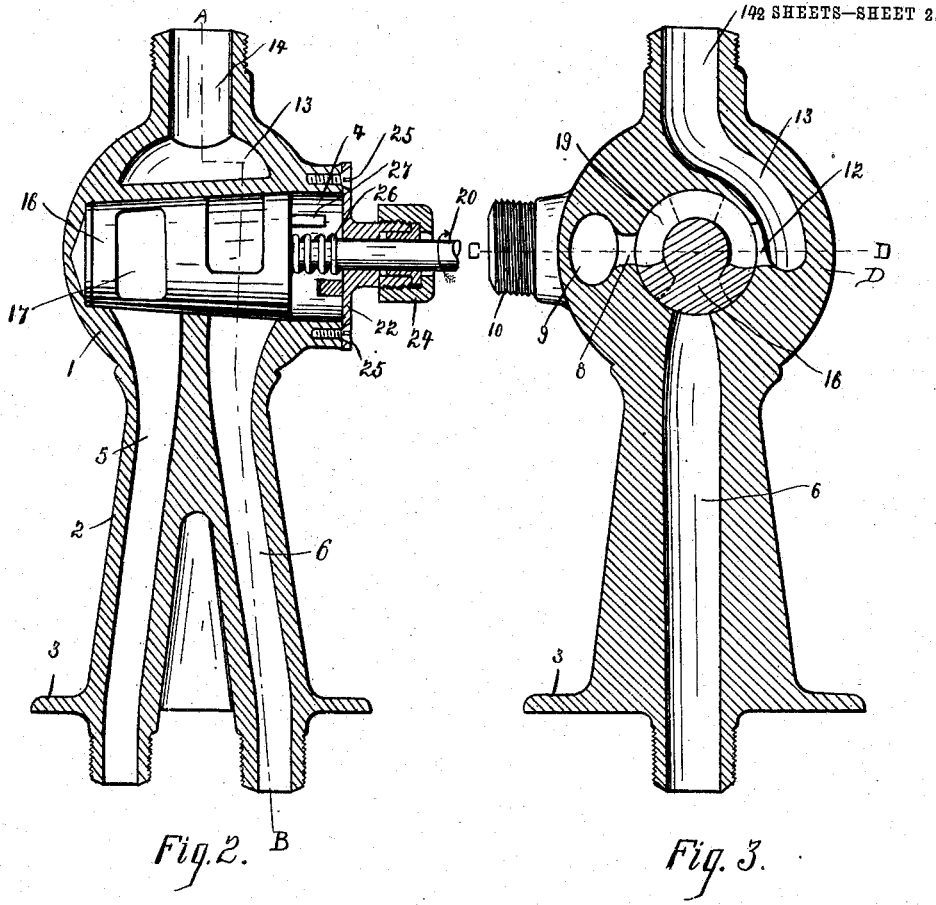
Figures 5, 6, 7:
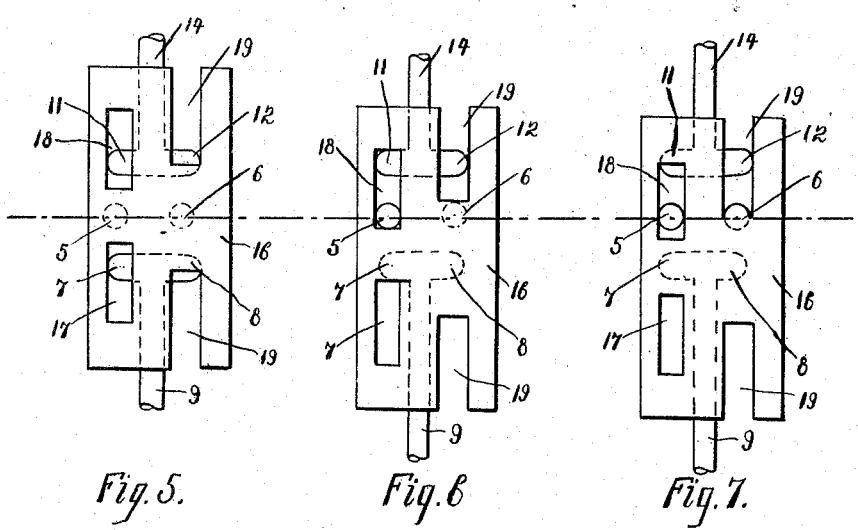

In the drawings, Figure 1 is a perspective view of the faucet, showing a quarter section of the body thereof cut away to expose the valve plug. Fig. 2 is a vertical sectional view through the faucet longitudinally of the valve plug. Fig. 3 is a vertical sectional view of the faucet on the line A—B in Fig. 2. Fig. 4 is a plan sectional view through the faucet on the line C—D in Fig. 3. Fig. 5 is a diagrammatic view of the plug and faucet ports with both hot and cold water inlets shut off. Fig. 6 is a diagrammatic view of the plug and faucet ports when the cold water inlet is open to one of the tap outlets. Fig. 7 is a diagrammatic view of the plug and faucet ports when half of the cold water outlet port 11 leading from the valve chamber is open and half the hot water inlet is open.

Like numerals of reference indicate corresponding parts in each figure.

Referring to the drawings, 1 is the body of the faucet preferably formed with the stand 2 having the flange 3, whereby the faucet may be secured to the top of a basin or the like.

4 is the valve chamber extending horizontally through the body 1 of the faucet from one side thereof.

5 is a cold water passage cored through the stand 2 and body 1 of the faucet, and opening into the valve chamber 4.

6 is a hot water passage cored through the stand 2 and body 1 of the faucet, and opening into the valve chamber 4 in longitudinal alinement with the cold water inlet 5.

7 and 8 are ports leading from the valve chamber 4 at right angles to the passages 5 and 6 and uniting with the common outlet 9.

10 is the basin tap suitably secured to the body 1 of the faucet over the outlet 9.

11 and 12 are ports leading from the valve chamber 4 diametrically opposite the ports 7 and 8, and uniting in the common cored passage 13 extending around the valve chamber through the body 1 of the faucet to the top thereof, where it terminates in the outlet 14.

15 is a shower or shampoo tap suitably secured to the body 1 of the faucet over the outlet 14.

16 is the valve plug tapered toward the inner end thereof as customary and snugly fitting the valve chamber 4, which is correspondingly tapered.

17 and 18 are channels in the periphery of the valve plug 16, said channels each extending a little more than quarter way around the valve plug, and being diametrically opposite one to the other and in circumferential alinement with the cold water inlet 5 and the ports 7 and 11.

19 is a channel in the valve plug 16 paralleling the ports 17 and 18, and in circumferential alinement with the hot water inlet 6 and the ports 8 and 12. The channel 19 extends approximately half way around the periphery of the valve plug, and overlaps a portion of each of the channels 17 and 18, but the said channels 17 and 18 each have one end thereof extending farther around the valve plug than the ends of the channel 19.

20 is a valve stem, having the handle 21 secured on the outer end thereof.

22 is a cover plate, having the outwardly-extending sleeve 23, through which the valve stem 20 extends, the said sleeve 23 being threaded on the outer periphery thereof to receive a packing gland 24. The cover plate 22 is secured to the body of the faucet over the end of the valve chamber 4 by the screws 25.

26 is a spiral spring encircling the valve stem 20 between the plate 22 and the valve plug 16, and exerting a continual inward pressure on the valve plug, whereby the same is firmly held to its seat in the valve chamber.

In the operation of the invention the valve plug as shown in Figs. 1, 2, 3 and 4 entirely shuts off the supply of both hot and cold water to both the basin and shampoo taps, and it will be noticed that the periphery on the under side of the plug closes both inlets for this purpose. This position of the plug is shown diametrically in Fig. 5, the plug itself being shown as a flat surface to more clearly indicate the relative positions of the ports, the inlet ports being shown directly in the center, and the outlets to both the basin and shampoo taps shown as extending from the ends thereof.

In Fig. 6 the position of the valve plug is shown when the cold water is passing to the shampoo tap, that is, the plug has been turned in the direction indicated by the arrows in the several figures, until the channel 18 registers with the cold water inlet passage 5, and the port 11 communicating with the outlet 14 to the shampoo tap 15.

In Fig. 7 the position of the plug is shown diagrammatically when it is turned still farther to admit an equal supply of hot and cold water to the shampoo tap. In this position the channel 18 is in full register with the cold water inlet 5 but only half open to the port 11, and the channel 19 which is in full register with the port 12 is only half open to the hot water inlet 6. Thus there is half the supply of cold water admitted through the port 11, and half the supply of hot water admitted through the port 6 to the shampoo tap. On further turning the plug in the direction of the arrow, the channel 18 will be entirely shut off from the port 11, and the hot water inlet 6 will be uncovered the full extent, so that a clear passage for hot water is made through the channel 19 and the port 12 leading to the shampoo tap. The relative positions of the channels 17 and 19 with the inlet passages 5 and 6 and the ports 7 and 8 leading to the basin tap are exactly similar to the channels above described, and will be brought into register by turning the valve plug in the reverse direction to the arrow from the position as shown in Fig. 5, so that a supply of cold water will be admitted first to the basin tap, following which the hot water will be admitted. It must also be understood that any intermediate position from those shown in Figs. 5, 6 and 7 may be used to admit any degree of cold or hot water, and a suitable stop or indicator may be used to limit the turning of the valve plug after it has been turned to first the cold, then half cold and half hot, and then full hot. A convenient form of stop as shown in the drawings comprises a pin 27 projecting from the outer end of the valve plug and which stops against the lug 28 projecting inwardly from the inside of the plate 22. The pin 27 contacts with the lug 28, and prevents further turning of the valve plug past the positions hereinbefore explained, and thus proper registration of the ports and channels is at all times assured.

What I claim as my invention is:

1. A faucet, comprising a body portion having a valve chamber formed therein, a cold water passage and a hot water passage leading to said valve chamber and a plurality of outlets communicating therewith, a valve plug fitting said valve chamber and turning therein and having a pair of channels in peripheral alinement with one water inlet passage and a third channel parallel to said pair of channels and in peripheral alinement with the other of said inlet passages adapted to be brought into communication with said outlets.

2. A faucet, comprising a body portion having a longitudinally-extending valve chamber formed therein, a plurality of water inlet passages communicating with said valve chamber in longitudinal alinement one with the other, a plurality of water outlets, a plurality of outlet ports connecting each of said water outlets with said valve chamber at points in circumferential alinement with said inlet passages and a plug valve having a pair of channels in circumferential alinement one with the other and located on opposite sides of the periphery of said valve plug and adapted to register with one of said inlet passages and corresponding outlet ports and a third channel equal in length to the combined length of said pair of channels in said valve plug and parallel therewith and in circumferential alinement with the other of said water inlet passages and corresponding outlet ports.

3. In a faucet having a tapered longitudinal valve chamber extending thereinto from one side, a plurality of inlet and outlet passages communicating therewith and a tapered valve plug fitting said chamber, of a cover plate having a central orifice through which the stem of said valve plug extends, means securing said plate over the open end of said valve chamber, a spring encircling the stem of said valve plug on the inside of said plate, a pin projecting from the outer end of said valve plug and a stop lug projecting inwardly from said cover plate.

Signed at the city of Ottawa, in the Province of Ontario, in the Dominion of Canada, this twenty-ninth day of July, 1910.

JOSEPH EDMOND LAURÉAT CHATILLON.

Witnesses:
K. F. MAC GIBBON,
F. R. BALMER.

Copies of this patent may be obtained for five cents each, by addressing the "Commissioner of Patents, Washington, D. C."